(12) United States Patent
Maeda et al.

(10) Patent No.: US 8,567,237 B2
(45) Date of Patent: Oct. 29, 2013

(54) COMBUSTION PRESSURE SENSOR

(75) Inventors: Shunsuke Maeda, Toyota (JP);
Yoshihiro Nakamura, Iwakura (JP);
Masayoshi Matsui, Ichinomiya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 358 days.

(21) Appl. No.: 13/010,370

(22) Filed: Jan. 20, 2011

(65) Prior Publication Data
US 2011/0271748 A1 Nov. 10, 2011

(30) Foreign Application Priority Data

Jan. 22, 2010 (JP) .................................... 2010-11714
Nov. 17, 2010 (JP) ................................ 2010-256577

(51) Int. Cl.
*G01M 15/08* (2006.01)

(52) U.S. Cl.
USPC ...................................................... 73/114.18

(58) Field of Classification Search
USPC ................ 73/114.16, 114.18, 114.19, 114.21
See application file for complete search history.

(56) References Cited

U.S. PATENT DOCUMENTS

| | | | | |
|---|---|---|---|---|
| 6,539,787 B1 * | 4/2003 | Murai et al. | ................ | 73/114.21 |
| 6,575,039 B2 * | 6/2003 | Murai et al. | ..................... | 73/756 |
| 7,185,621 B2 * | 3/2007 | Yamada et al. | ........... | 123/145 A |
| 7,635,826 B2 * | 12/2009 | Yamada et al. | ................ | 219/270 |
| 2001/0008090 A1 * | 7/2001 | Murai et al. | ..................... | 73/756 |
| 2005/0150301 A1 * | 7/2005 | Skinner et al. | ................... | 73/714 |
| 2006/0053875 A1 | 3/2006 | Haussner et al. | | |
| 2006/0090544 A1 * | 5/2006 | Yorita et al. | ................. | 73/35.12 |
| 2007/0245806 A1 * | 10/2007 | Hirose et al. | ................. | 73/35.13 |
| 2007/0289370 A1 * | 12/2007 | Hirose et al. | .................... | 73/116 |

FOREIGN PATENT DOCUMENTS

JP 2006-84468 A 3/2006

* cited by examiner

*Primary Examiner* — Eric S McCall
(74) *Attorney, Agent, or Firm* — Sughrue Mion, PLLC

(57) ABSTRACT

A combustion pressure sensor (1) includes a housing (2) having an axial hole (23), a flexible member (8) fixed at one end to the housing (2) and being displaceable along the direction of axis (CL1), a pressure transmission body (3) whose outer circumferential surface is fixed to the other end of the flexible member (8), and a sensor element (42) fixed to the housing (2) and outputting a signal on the basis of a pressure applied thereto from the pressure transmission body (3). The housing (2) includes a main body portion (21) having a screw portion (24), and a cap member (22) having a press contact portion (26) which is pressed against the internal combustion engine when the screw portion (24) is screwed into the mounting hole of an internal combustion engine. The one end of the flexible member (8) is fixed to the main body portion (21).

4 Claims, 9 Drawing Sheets

FIG. 6A
FIG. 6B
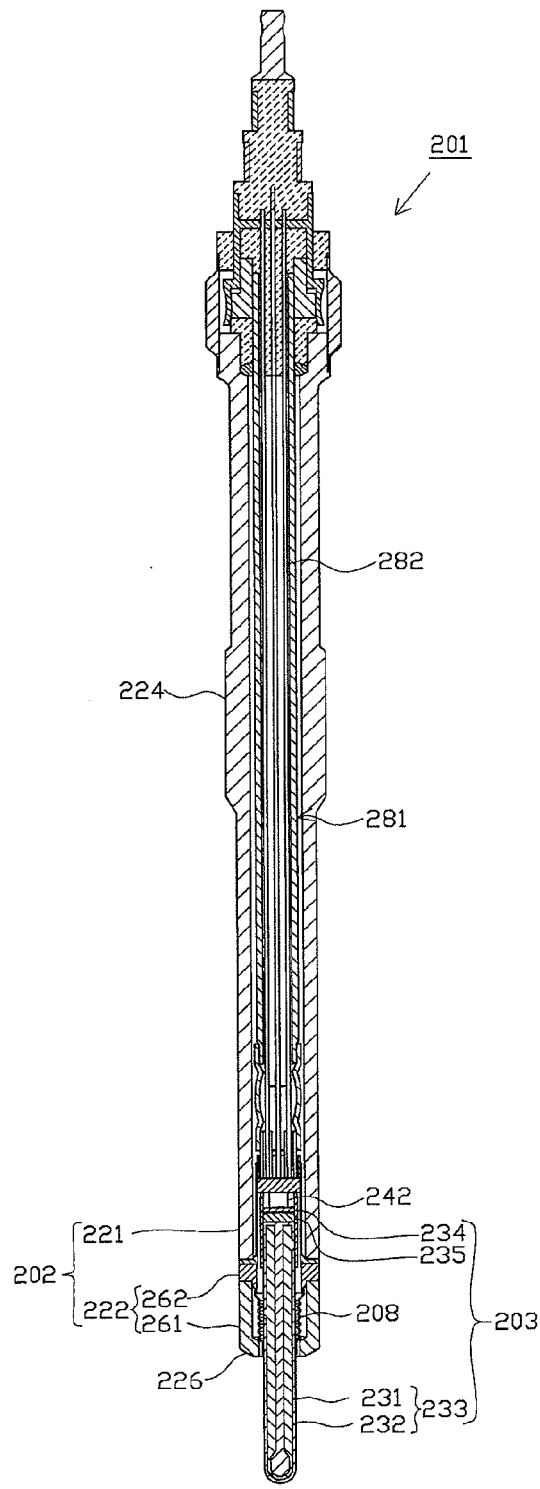
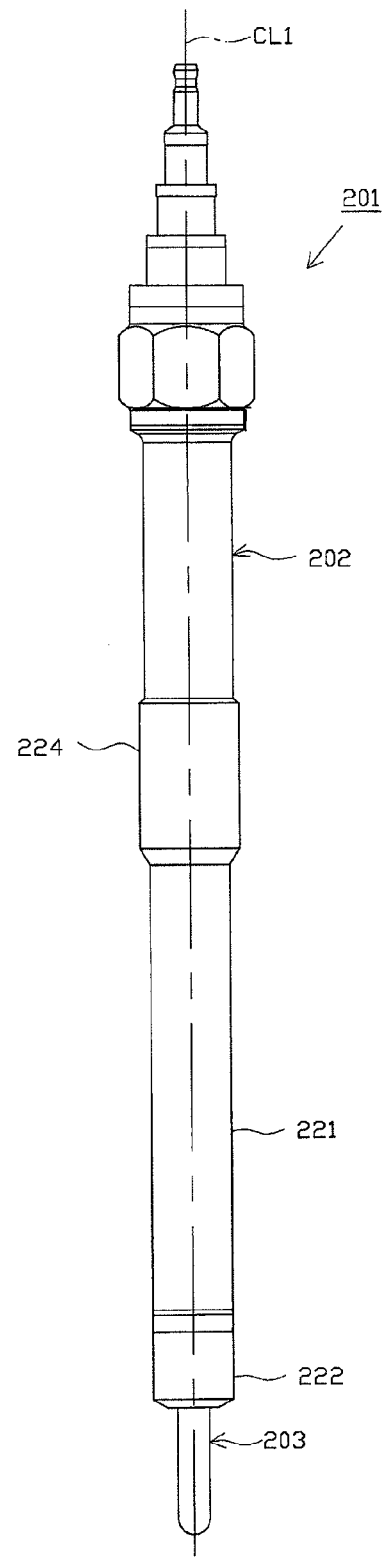

COMBUSTION PRESSURE SENSOR

TECHNICAL FIELD

The present invention relates to a combustion pressure sensor for detecting combustion pressure within a combustion chamber.

BACKGROUND ART

In general, a combustion pressure sensor for detecting combustion pressure includes a tubular housing having an axial hole extending in the direction of an axis; a rodlike pressure transmission body inserted into the axial hole such that its front end portion is exposed to the outside; and a sensor element which outputs a signal on the basis of a pressure applied thereto from the pressure transmission body. The housing includes a main body portion which has, on its outer circumferential surface, a screw portion for screw engagement with a mounting hole of an internal combustion engine; and a cap member joined to a front end portion of the main body portion. When the combustion pressure sensor is attached to the mounting hole of the internal combustion engine, a press contact portion provided at a front end portion of the cap member is press-contacted with the internal combustion engine, whereby sealing is established between the internal combustion engine and the combustion pressure sensor.

Also, there has been known a technique in which the above-mentioned pressure transmission body is fixed to the housing via a flexible member which is diplaceable along the direction of the axis, whereby the pressure transmission body is made movable in relation to the housing in the direction of the axis, and pressure can be transmitted from the pressure transmission body to the sensor element (see, for example, Patent Document 1).

PRIOR ART DOCUMENT

Patent Document

[Patent Document 1] Japanese Patent Application Laid-Open (kokai) No. 2006-84468

SUMMARY OF THE INVENTION

Problems to be Solved by the Invention

Incidentally, when the screw portion is screwed into a mounting hole of an internal combustion engine, a portion of the housing located between the front end of the screw portion and the press contact portion may contract along the axial direction due to an axial force generated as a result of the screw coupling, deformation of an engine head at the time of combustion, etc. If the housing contracts, a force along the axial direction acts on the pressure transmission body via the flexible member. As a result, the force along the axial direction is added to the pressure transmitted from the pressure transmission body to the sensor element. In such a case, the sensor element may fail to accurately detect the combustion pressure.

The present invention has been conceived in view of the above circumstances, and an object of the invention is to provide a combustion pressure sensor which can improve the detection accuracy of combustion pressure through reduction of contractive deformation of a main body portion of a housing of the sensor, which deformation occurs when the combustion pressure sensor is attached to an internal combustion engine.

Means for Solving the Problems

Configurations suitable for solving the above problems will next be described in itemized form. If needed, actions and effects specific to the configurations will be additionally described.

Configuration 1. A combustion pressure sensor of the present configuration comprises:

a tubular housing having an axial hole extending in a direction of an axis;

a flexible member disposed within the axial hole and fixed at one end to the housing, the flexible member being displaceable and contractable along the direction of the axis;

a rod-shaped pressure transmission body inserted into the axial hole and fixed, through its outer circumferential surface, to the other end of the flexible member, the pressure transmission body having a front end portion exposed to the outside; and a sensor element fixed directly or indirectly to the housing and outputting a signal on the basis of a pressure applied thereto from the pressure transmission body, wherein the housing includes a main body portion having, on its outer circumferential surface, a screw portion for screw engagement with a mounting hole of an internal combustion engine, and a cap member joined to a front end portion of the main body portion and having a press contact portion which is press-contacted with the internal combustion engine when the screw portion is screwed into the mounting hole of the internal combustion engine; and the one end of the flexible member is fixed to the main body portion, the combustion pressure sensor being characterized in that a relation A<B is satisfied where A represents an amount of compression per unit length along the axis of the main body portion and B represents an amount of compression per unit length along the axis of the cap member, the compression amounts being measured when a force along the axis is applied to the housing.

According to Configuration 1, when a force along the direction of the axis is applied, the cap member contracts more easily than does the main body portion. Accordingly, when the combustion pressure sensor is attached to an internal combustion engine, the cap member which does not affect the pressure transmission body even when it deforms compressively can be caused to deform to a greater degree, and the amount of deformation of the main body portion which affects the pressure transmission body can be made relatively small. As a result, the force along the axial direction applied to the pressure transmission body as a result of deformation of the main body portion can be reduced effectively, and the detection accuracy of combustion pressure can be improved.

Configuration 2. A combustion pressure sensor of the present configuration comprises:

a tubular housing having an axial hole extending in a direction of an axis;

a flexible member disposed within the axial hole and fixed at one end to the housing, the flexible member being displaceable and contractable along the direction of the axis;

a rod-shaped pressure transmission body inserted into the axial hole and fixed, through its outer circumferential surface, to the other end of the flexible member, the pressure transmission body having a front end portion exposed to the outside; and a sensor element fixed directly or indirectly to the housing and outputting a signal on the basis of a pressure applied thereto from the pressure transmission body, wherein the housing has a screw portion for screw engagement with a mounting hole of an internal combustion engine, and a press contact portion which is press-contacted with the internal combustion engine when the screw portion is screwed into the mounting hole of the internal combustion engine, the combustion pressure sensor being characterized in that the one end of the flexible member is fixed to the housing on the front end side of a portion of the housing located at the center between a rear end of the screw portion and the press contact portion;

a region where the flexible member and the pressure transmission body are fixed together is located within the housing; and a relation A<B is satisfied where A represents an amount of compression of a portion of the housing between a portion of the housing to which the flexible member is fixed and a front end of the screw portion, and B represents an amount of compression of a portion of the housing between the portion of the housing to which the flexible member is fixed and a front end of the press contact portion, the compression amounts being measured when a force along the axis is applied to a portion of the housing located between the front end of the screw portion and the press contact portion.

According to Configuration 2, when the combustion pressure sensor is attached to an internal combustion engine, a portion which does not affect the pressure transmission body even when it deforms compressively (a portion of the housing between a portion to which the flexible member is fixed and the front end of the screw portion) contracts more greatly than does a portion which affects the pressure transmission body when it deforms compressively (a portion of the housing between the portion to which the flexible member is fixed and the front end of the press contact portion). Accordingly, the force along the axial direction applied to the pressure transmission body when the combustion pressure sensor is attached to an internal combustion engine can be reduced effectively, and the detection accuracy of combustion pressure can be improved.

Further, one end of the flexible member is fixed to the housing on the front end side of a portion of the housing located at the center between the rear end of the screw portion and the press contact portion. Therefore, the length of the flexible member as measured along the axis can be made relatively short, and the pressure transmission body can be held in a more stable state. As a result, the detection accuracy of combustion pressure can be improved further.

Configuration 3. A combustion pressure sensor of the present configuration comprises:

a tubular housing having an axial hole extending in a direction of an axis;

a flexible member disposed within the axial hole and fixed at one end to the housing, the flexible member being displaceable and contractable along the direction of the axis;

a rod-shaped pressure transmission body inserted into the axial hole and fixed, through its outer circumferential surface, to the other end of the flexible member, the pressure transmission body having a front end portion exposed to the outside; and a sensor element fixed directly or indirectly to the housing and outputting a signal on the basis of a pressure applied thereto from the pressure transmission body, wherein the housing includes a main body portion having, on its outer circumferential surface, a screw portion for screw engagement with a mounting hole of an internal combustion engine, and a cap member joined to a front end portion of the main body portion and having a press contact portion which is press-contacted with the internal combustion engine when the screw portion is screwed into the mounting hole of the internal combustion engine; and the one end of the flexible member is fixed to the main body portion, the combustion pressure sensor being characterized in that the cap member has a Young's modulus smaller than that of the main body portion.

According to Configuration 3, the Young's modulus of the cap member is made smaller than that of the main body portion. Therefore, when a force along the direction of the axis is applied, the cap member contracts more easily than does the main body portion. Accordingly, when the combustion pressure sensor is attached to an internal combustion engine, the cap member which does not affect the pressure transmission body even when it deforms compressively can be caused to deform to a greater degree, and the amount of deformation of the main body portion which affects the pressure transmission body can be made relatively small. As a result, the force along the axial direction applied to the pressure transmission body as a result of deformation of the main body portion can be reduced effectively, and the detection accuracy of combustion pressure can be improved.

Configuration 4. A combustion pressure sensor of the present configuration comprises:

a tubular housing having an axial hole extending in a direction of an axis;

a flexible member disposed within the axial hole and fixed at one end to the housing, the flexible member being displaceable and contractable along the direction of the axis;

a rod-shaped pressure transmission body inserted into the axial hole and fixed, through its outer circumferential surface, to the other end of the flexible member, the pressure transmission body having a front end portion exposed to the outside; and a sensor element fixed directly or indirectly to the housing and outputting a signal on the basis of a pressure applied thereto from the pressure transmission body, wherein the housing includes a main body portion having, on its outer circumferential surface, a screw portion for screw engagement with a mounting hole of an internal combustion engine, and a cap member joined to a front end portion of the main body portion and having a press contact portion which is press-contacted with the internal combustion engine when the screw portion is screwed into the mounting hole of the internal combustion engine; and the one end of the flexible member is fixed to the main body portion, the combustion pressure sensor being characterized in that the cap member has a cylindrical tubular portion extending along the axis from a rear end of the press contact portion; and the cylindrical portion has, on its inner circumferential surface or its outer circumferential surface, an annular groove which is centered at the axis and which forms a thin wall portion.

According to Configuration 4, a thin wall portion is provided on the cylindrical tubular portion of the cap member. Therefore, when the combustion pressure sensor is attached to an internal combustion engine, the cap member can be caused to deform to a greater degree, and the amount of deformation of the main body portion can be made relatively small. As a result, the force along the axial direction applied to the pressure transmission body as a result of deformation of the main body portion can be reduced effectively, and the detection accuracy of combustion pressure can be improved.

Configuration 5. A combustion pressure sensor of the present configuration comprises:

a tubular housing having an axial hole extending in a direction of an axis;

a flexible member disposed within the axial hole and fixed at one end to the housing, the flexible member being displaceable and contractable along the direction of the axis;

a rod-shaped pressure transmission body inserted into the axial hole and fixed, through its outer circumferential surface, to the other end of the flexible member), the pressure transmission body having a front end portion exposed to the outside; and a sensor element fixed directly or indirectly to the housing and outputting a signal on the basis of a pressure applied thereto from the pressure transmission body, wherein the housing has a screw portion for screw engagement with a mounting hole of an internal combustion engine, and a press contact portion which is press-contacted with the internal combustion engine when the screw portion is screwed into the mounting hole of the internal combustion engine, the combustion pressure sensor being characterized in that the sensor element is fixed directly or indirectly to a portion of the housing located between a front end of the screw portion and a front end of the press contact portion;

the flexible member is fixed to a portion of the housing located between the portion of the housing to which the sensor element is fixed and the press contact portion; and a relation X<Y is satisfied where X represents an amount of compression of a portion of the housing between the portion of the housing to which the sensor element is fixed and the portion of the housing to which the flexible member is fixed, and Y represents an amount of compression of a portion of the housing between the portion of the housing to which the flexible member is fixed and a front end of the press contact portion, the compression amounts being measured when a force along the axis is applied to a portion of the housing located between the front end of the screw portion and the press contact portion.

According to Configuration 5, a portion of the housing which affects the pressure transmission body through its compressive deformation (a portion of the housing between the portion to which the sensor element is fixed and the portion to which the flexible member is fixed) can be shortened further. Therefore, the force along the axial direction applied to the pressure transmission body when the combustion pressure sensor is attached to an internal combustion engine can be reduced effectively.

Moreover, when the combustion pressure sensor is attached to an internal combustion engine, a portion of the housing which does not affect the pressure transmission body even when it deforms compressively (a portion of the housing between a portion to which the flexible member is fixed and the front end of the press contact portion) contracts more greatly than does a portion of the housing which affects the pressure transmission body when it deforms compressively (a portion of the housing between the portion to which the sensor element is fixed and the portion to which the flexible member is fixed). Therefore, the force along the axial direction applied to the pressure transmission body when the combustion pressure sensor is attached to an internal combustion engine can be reduced further, and the detection accuracy of combustion pressure can be improved further.

Configuration 6. A combustion pressure sensor of the present configuration comprises:

a tubular housing having an axial hole extending in a direction of an axis;

a flexible member disposed within the axial hole and fixed at one end to the housing, the flexible member being displaceable and contractable along the direction of the axis;

a rod-shaped pressure transmission body inserted into the axial hole and fixed, through its outer circumferential surface, to the other end of the flexible member, the pressure transmission body having a front end portion exposed to the outside; and a sensor element fixed directly or indirectly to the housing and outputting a signal on the basis of a pressure applied thereto from the pressure transmission body, wherein the housing has a screw portion for screw engagement with a mounting hole of an internal combustion engine, and a press contact portion which is press-contacted with the internal combustion engine when the screw portion is screwed into the mounting hole of the internal combustion engine, the combustion pressure sensor being characterized in that the sensor element is fixed directly or indirectly to a portion of the housing located between a front end of the screw portion and a front end of the press contact portion;

the flexible member is fixed to a portion of the housing located between the portion of the housing to which the sensor element is fixed and the press contact portion; and a relation X<Z is satisfied where X represents an amount of compression of a portion of the housing between the portion of the housing to which the sensor element is fixed and the portion of the housing to which the flexible member is fixed, and Z represents an amount of compression of a portion of the housing between a front end of the screw portion and the portion of the housing to which the sensor element is fixed, the compression amounts being measured when a force along the axis is applied to a portion of the housing located between the front end of the screw portion and the press contact portion.

According to Configuration 6, a portion of the housing which affects the pressure transmission body through its compressive deformation can be shortened further. Therefore, the force along the axial direction applied to the pressure transmission body when the combustion pressure sensor is attached to an internal combustion engine can be reduced effectively.

Moreover, when the combustion pressure sensor is attached to an internal combustion engine, a portion of the housing which does not affect the pressure transmission body even when it deforms compressively (a portion of the housing between the front end of the screw portion and a portion to which the sensor element is fixed) contracts more greatly than does a portion of the housing which affects the pressure transmission body when it deforms compressively. Therefore, the force along the axial direction applied to the pressure transmission body when the combustion pressure sensor is attached to an internal combustion engine can be reduced further, and the detection accuracy of combustion pressure can be improved further.

Configuration 7. A combustion pressure sensor of the present configuration is a combustion pressure sensor according to any one of Configurations 1 to 6, wherein at least a portion of the exposed front end portion of the pressure transmission body is a heat generation unit.

As in Configuration 7, at least a portion of the exposed front end portion of the pressure transmission body may be formed by a heat generation unit which imparts to the combustion pressure sensor a function of heating the interior of a combustion chamber. In this case as well, actions and effects similar to those of the above-described Configuration 1, etc. can be attained.

BRIEF DESCRIPTION OF THE DRAWINGS

FIGS. 6A and 6B Views showing the structure of a combustion pressure sensor in a third embodiment, wherein FIG. 6A is a cross-sectional view, and FIG. 6B is a front view.

MODE FOR CARRYING OUT THE INVENTION

First Embodiment

Figure 1:
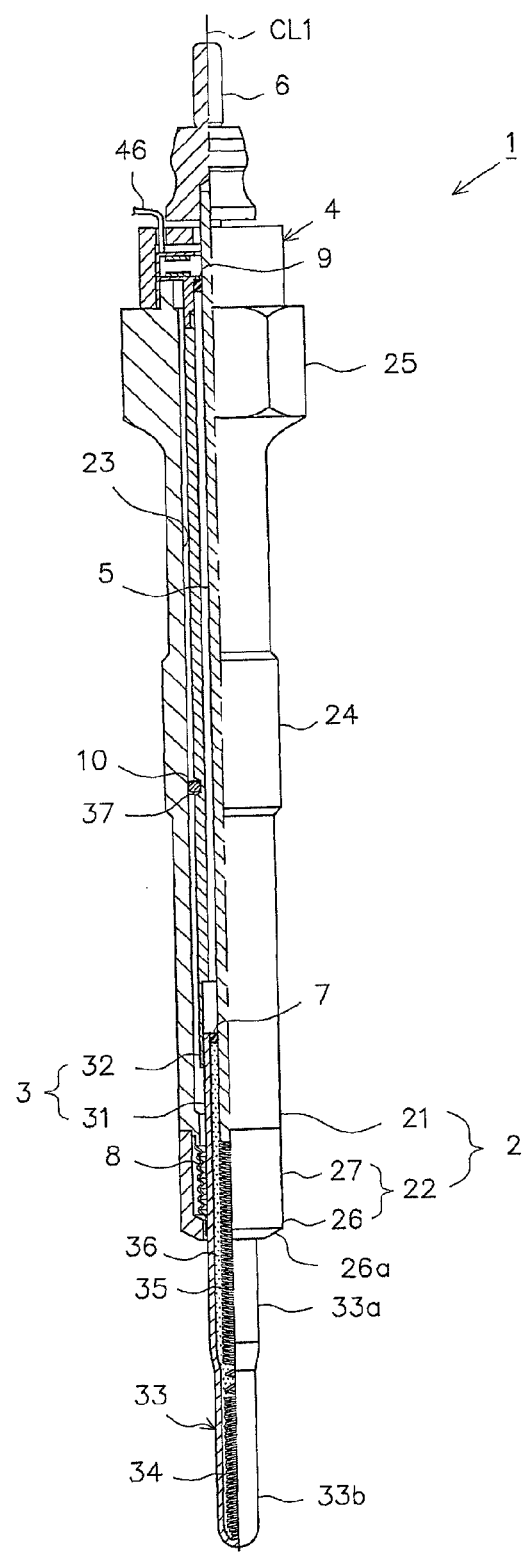
FIG. 1 Partially sectioned front view showing the structure of a combustion pressure sensor.

A first embodiment will now be described with reference to the drawings. FIG. 1 is a partially sectioned front view showing an example of a combustion pressure sensor having a function of heating the interior of a combustion chamber.

As shown in FIG. 1, a combustion pressure sensor having a heating function (hereinafter referred to as a "combustion pressure sensor") 1 includes a tubular housing 2; a pressure transmission body 3 whose front end portion is exposed from the front end of the housing 2; and a sensor structure 4 for detecting combustion pressure.

The housing 2 is composed of a main body portion 21 and a cap member 22 each of which has a tubular shape and which are joined together. The housing 2 has an axial hole 23 extending therethrough in the direction of an axis CL1.

The main body portion 21 is formed of a predetermined metallic material. The main body portion 21 has, on its outer circumferential surface, a screw portion 24 to be screwed into a mounting hole of an internal combustion engine such as a diesel engine, and a tool engagement portion 25 which has a hexagonal cross section and with which a tool such as a torque wrench is engaged.

Figure 4:
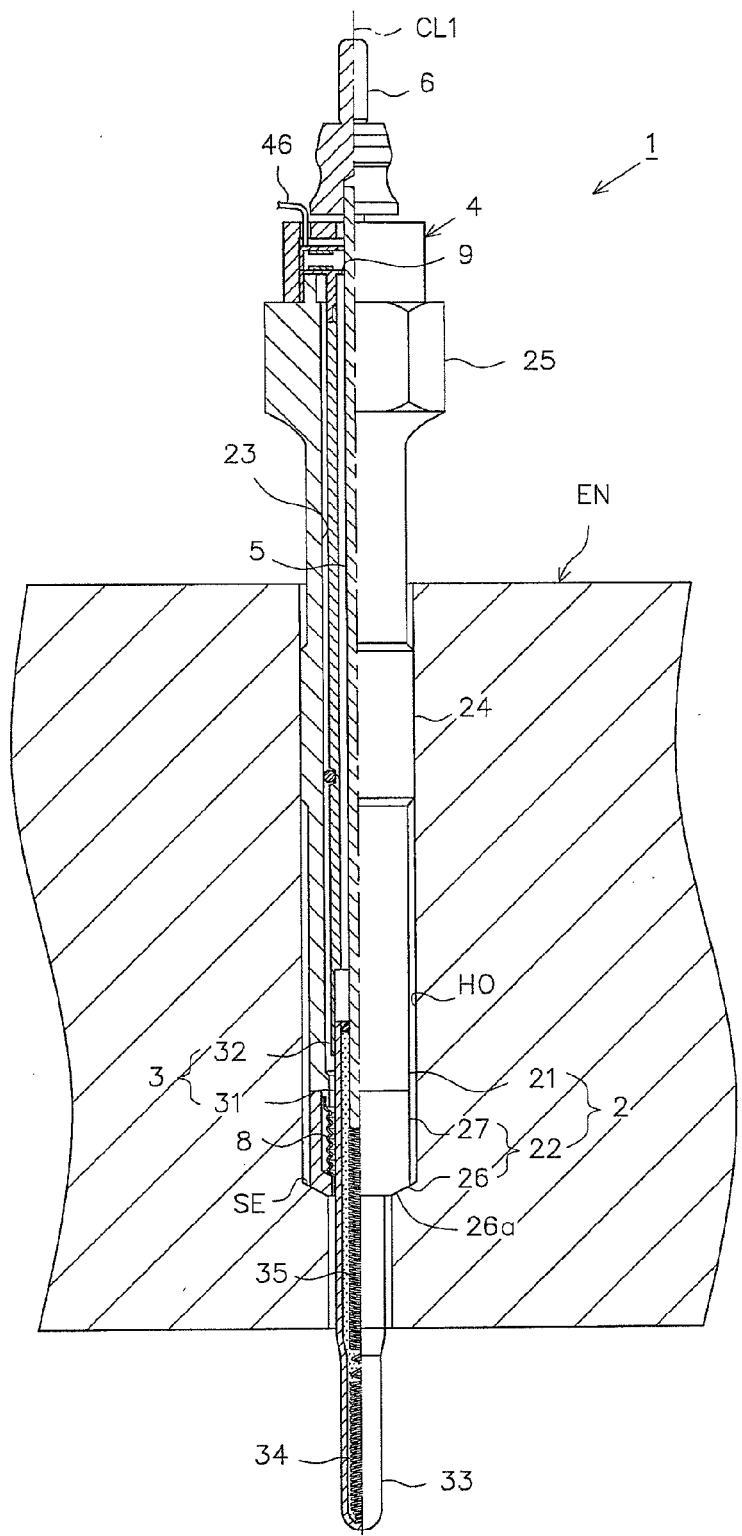
FIG. 4 Partially sectioned front view showing a state in which the combustion pressure sensor is attached to an internal combustion engine.

The cap member 22 is formed of a predetermined metallic material, and its rear end portion is joined to a front end portion of the main body portion 21. The cap member 22 has a press contact portion 26, and a tubular cylindrical portion 27 extending rearward from the press contact portion 26 along the axis CL1. The press contact portion 26 is formed to have a wall thickness (thickness in the radial direction) greater than that of the cylindrical portion 27, and has a taper surface 26a tapered frontward in the direction of the axis CL1. When the screw portion 24 is screwed into a mounting hole HO of an internal combustion engine EN, the taper surface 26a of the press contact portion 26 is pressed against a tapered seat surface SE formed at the bottom end of the mounting hole HO, whereby sealing is established between the internal combustion engine EN and the combustion pressure sensor 1 (see FIG. 4).

The pressure transmission body 3 is composed of a barlike heat generation unit 31 and a tubular sleeve 32 connected together in series.

The heat generation unit 31 is configured such that a heat generation coil 34 and a control coil 35 are placed in a tube 33 along with insulating powder 36 such as powder of magnesium oxide.

The tube 33 is formed of a metallic material (e.g., Inconel, a stainless steel alloy, etc.) which contains iron (Fe) or nickel (Ni) as the main component, and has a closed front end portion. The tube 33 has, on its rear end side, a press-fit large diameter portion 33a which is formed by means of a swaging process or the like and which has a relatively large outer diameter. Meanwhile, the tube 33 has, on its front end side, a heat generation portion 33b which is smaller in diameter than the press-fit large diameter portion 33a and in which the heat generation coil 34 is accommodated.

The heat generation coil 34 and the control coil 35 are connected together in series, and a front end portion of the heat generation coil 34 is joined to a front end portion of the tube 33. The heat generation coil 34 is formed from a resistance heating wire which contains Fe (main component), chromium (Cr), aluminum (Al), etc. Meanwhile, the control coil 35 is formed of a material which is greater in temperature coefficient of electrical resistivity than the material of the heat generation coil 34; for example, formed from a resistance heating wire made of a material whose main component is Co or Ni (e.g., cobalt (Co)—Ni—Fe alloy). Thus, the control coil 35 increases its electrical resistance as a result of its own heat generation or as a result of receipt of heat generated by the heat generation coil 34, to thereby control the amount of electric power supplied to the heat generation coil 34. That is, at the beginning of energization, a relatively large amount of electric power is supplied to the heat generation coil 34, so that the temperature of the heat generation coil 34 increases sharply. Meanwhile, when the heat generation of the heat generation coil 34 proceeds, the control coil 35 is heated by heat such as the heat generated by the heat generation coil 34, and the electrical resistance of the control coil 35 increases. As a result, the amount of electric power supplied to the heat generation coil 34 decreases. Accordingly, the heat generation unit 31 has a temperature rising characteristic such that, after the rapid temperature rising at the beginning of energization, the supply of electric power is restricted by the action of the control coil 35, whereby the temperature becomes saturated. That is, since the control coil 35 is provided, it is possible to prevent excessive increase (overshoot) of the temperature of the heat generation coil 34 while enhancing the rapid temperature rising performance.

Notably, a predetermined external controller may be used so as to adjust the amount of electric power supplied to the heat generation coil 34 to thereby control the heat generation of the heat generation coil 34. In such a case, the control coil 35 can prevent an excessive temperature rising of the heat generation coil 34, which would otherwise occur when the external controller fails. That is, the control coil 35 may be used so as to positively adjust the amount of electric power supplied to the heat generation coil 34, or may be used so as to prevent the supply of overcurrent to the heat generation coil 34, which would otherwise occur, for example, as a result of failure of the external controller.

The insulating powder 36 is charged around the heat generation coil 34 and the control coil 35 within the tube 33. Therefore, whereas the front end portion of the heat generation coil 34 is electrically connected to the tube 33, the outer circumferential surfaces of the heat generation coil 34 and the control coil 35 are electrically insulated from the inner circumferential surface of the tube 33 by means of the insulating powder 36.

A center rod 5 formed of a metal and extending in the direction of the axis CL1 is provided in the axial hole 23. A front end portion of the center rod 5 is inserted into the tube 33, and is electrically connected to the control coil 35. An electrically conductive terminal fitting 6 is fixed to a rear end portion of the center rod 5. Electric power is supplied to the heat generation coil 34 via the terminal fitting 6 and the center rod 5. Notably, an annular rubber member 7 is provided between a rear end portion of the tube 33 and the center rod 5 so as to seal the interior of the tube 33.

Figure 2:
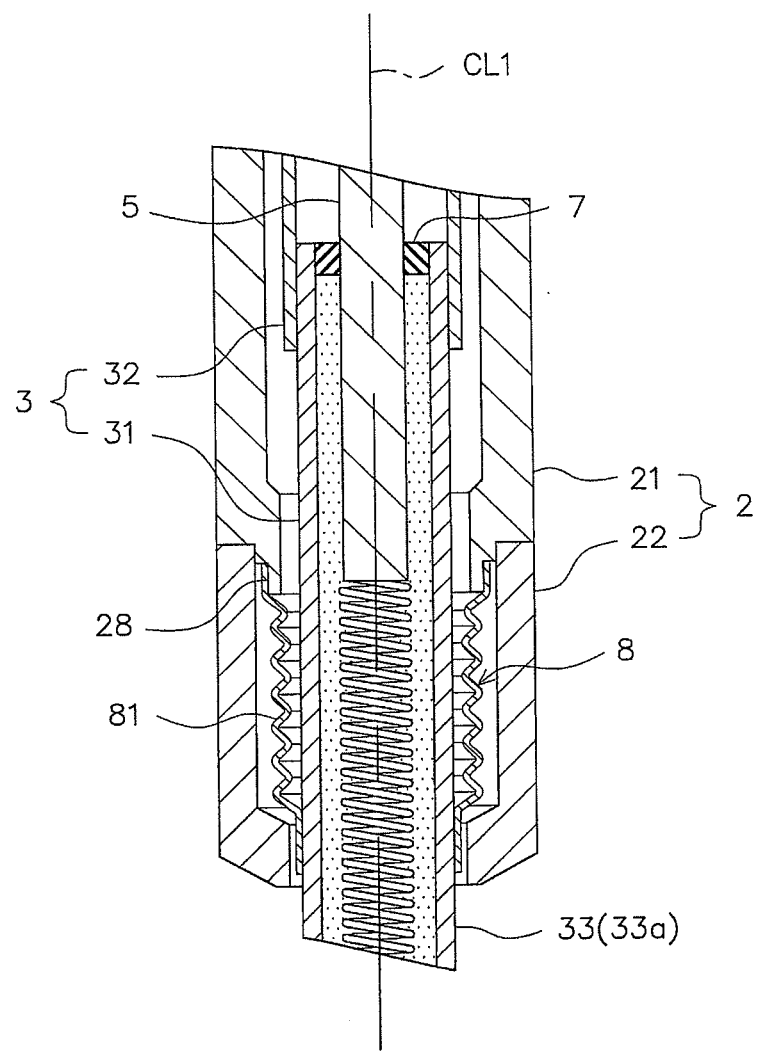
FIG. 2 Enlarged partial cross-sectional view showing the structures of a flexible member, etc.

As shown in FIG. 2, the pressure transmission body 3 (the heat generation unit 31) is held by the main body portion 21 via a tubular flexible member 8 formed of a metal (e.g., SUS). Specifically, the main body portion 21 has a tubular projection 28, which projects frontward, with respect to the direction of the axis CL1, from a front end portion of the main body portion 21. The projection 28 is press-fitted into a rear end portion of the flexible member 8. That is, the rear end portion of the flexible member 8 is fixed to the housing 2 on the front end side of a portion of the housing 2 located at the center between the rear end of the screw portion 24 and the press contact portion 26. Meanwhile, the press-fit large diameter portion 33a of the tube 33 is press-fitted into and is joined to a front end portion of the flexible member 8. Thus, the pressure transmission body 3 is held by the main body portion 21.

The flexible member 8 has, at its generally central portion, a bellows portion 81, which is displaceable through expanding and contracting itself along the direction of the axis CL1. Thus, the flexible member 8 can expand and contract along the direction of the axis CL1. When a pressure is applied to a front end portion of the heat generation unit 31, the bellows portion 81 of the flexible member 8 contracts, and, with this deformation, the heat generation unit 31 held by the flexible member 8 moves rearward in relation to the housing 2.

Referring back to FIG. 1, the sleeve 32 is formed of a predetermined metallic material, and is provided on the radially outer side of the center rod 5 such that a clearance is formed between the sleeve 32 and the inner circumferential surface of the axial hole 23, and a clearance is formed between the sleeve 32 and the outer circumferential surface of the center rod 5. A rear end portion of the heat generation unit 31 is press-fitted into and joined to a front end portion of the sleeve 32. Therefore, when the heat generation unit 31 moves in relation to the housing 2, the sleeve 32 also moves in relation to the housing 2.

An annular insulating rubber member 9 is inserted between a rear end portion of the sleeve 32 and the center rod 5. The insulating rubber member 9 prevents deflective movement of a rear end portion of the center rod 5, which would otherwise occur because of vibration, and avoids contact between the center rod 5 and the sleeve 32. An annular grove 37, which is centered at the axis CL1, is formed on an outer circumferential surface of the sleeve 32 at a generally central position along the axis CL1. An annular O-ring 10 is disposed in the groove 37. The O-ring 10 is configured such that it comes into contact with both the sleeve 32 and the main body portion 21. Thus, it is possible to prevent the sleeve 32 from resonating as a result of operation of an internal combustion engine, and prevents the sleeve 32 from coming into contact with the wall surface of the axial hole of the housing 2; i.e., prevents formation of a short circuit between the sleeve 32 and the housing 2.

Figure 3:
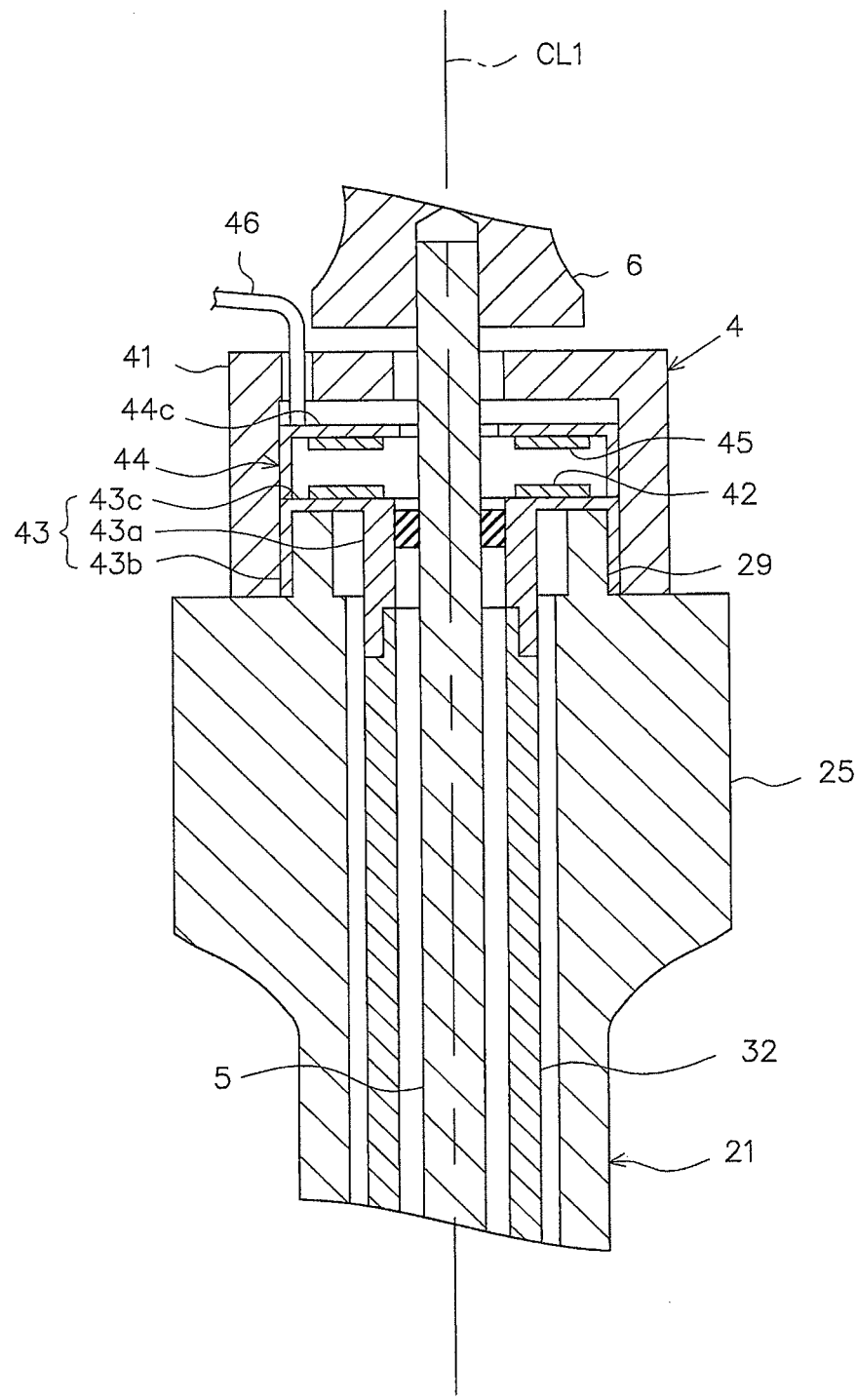
FIG. 3 Enlarged partial cross-sectional view showing the structures of a sensor structure, etc.

As shown in FIG. 3, the sensor structure 4 is joined to the rear end of the main body portion 21. The sensor structure 4 is composed of a casing 41 and various components disposed within the casing 41, such as a sensor element 42, a distortion member 43, and a relay member 44.

The casing 41 assumes a cylindrical tubular shape, and has, at its rear end, a rear wall portion (upper wall portion) having a hole through which the center rod 5 can be passed. A tubular attachment portion 29 projecting from a rear end portion of the main body portion 21 is inserted into the casing 41. In this state, the casing 41 and the attachment portion 29 are joined together, whereby the sensor structure 4 is joined to the main body portion 21.

The distortion member 43 provided within the casing 41 assumes an annular shape, and has an inner wall portion 43a having an outer diameter approximately equal to that of the sleeve 32, an outer wall portion 43b in contact with the inner circumferential surface of the casing 41, and a rear wall portion 43c connecting the two wall portions 43a and 43b. In addition, the relay member 44 provided in the casing 41 assumes a cylindrical tubular shape, and has a rear wall portion 44c having a hole through which the center rod 5 can be passed. The relay member 44 is placed on the distortion member 43, and the outer circumferential surfaces of the distortion member 43 and the relay member 44 are fixed to the inner circumferential surface of the casing 41. A rear end portion of the sleeve 32 is joined to a front end portion of the inner wall portion 43a of the distortion member 43. Accordingly, when the sleeve 32 moves relatively as a result of the heat generation unit 31 receiving a pressure, the rear wall portion 43c of the distortion member 43 is pushed by the sleeve 32 and deforms.

The above-mentioned sensor element 42 is disposed on the rear wall portion 43c of the distortion member 43. The sensor element 42 is composed of, for example, a known semiconductor stain gauge which includes piezoresistance elements formed on a semiconductor substrate such as a silicon substrate. The resistance of the sensor element 42 changes in accordance with the degree of deformation of the rear wall portion 43c of the distortion member 43. A relay substrate 45 is disposed on the rear wall portion 44c of the relay member 44 facing the rear wall portion 43c of the distortion member 43. The relay substrate 45 is electrically connected to the sensor element 42 by means of wire boding or flexible cable (not shown), and has a function of converting the resistance of the sensor element 42 to a voltage, and amplifying the voltage. The amplified voltage is output to an external circuit such as an ECU (not shown) via a cable 46 connected to the relay member 44.

In the present embodiment, whereas the cap member 22 is formed of a material having a relatively low Young's modulus (e.g., a titanium alloy, aluminum, or the like), the housing is formed of a material having a relatively high Young's modulus (e.g., carbon steel, SUS, or the like). That is, the Young's modulus of the cap member 22 is made smaller than that of the main body portion 21.

A method of manufacturing the combustion pressure sensor 1 having the above-described configuration will be described. Notably, portions which are not specifically described are manufactured by conventionally known methods.

First, the heat generation unit 31 is manufactured. Specifically, a resistance heating wire containing Fe as the main component is formed into a coil shape so as to obtain the heat generation coil 34, and a resistance heating wire made of a Co alloy or the like is formed into a coil shape so as to obtain the control coil 35. A rear end portion of the heat generation coil 34 and a front end portion of the control coil 35 are joined together. Subsequently, the front end of the center rod 5 and the heat generation coil 34 and the control coil 35 united with the center rod 5 are placed in the tube 33 whose front end has not yet been closed. By means of arc welding, the front end portion of the tube 33 is closed, and a front end portion of the heat generation coil 34 is joined to the front end portion of the tube 33. After that, the insulating powder 36 is charged into the tube 33, and swaging is performed on the tube 33. As a result, the fit-in large diameter portion 33a and the heat generation portion 33b are formed on the tube 33, and the heat generation unit 31 united with the center rod 5 is obtained.

Furthermore, the main body 21, which has the axial hole 23, the screw portion 24, etc., is manufactured by means of performing forging, rolling, or a like process on a predetermined alloy. Moreover, an alloy whose Young's modulus is smaller than that of the alloy that constitutes the main body portion 21 is prepared, and forging or a like process is performed on the prepared alloy, to thereby manufacture the cap member 22. In addition, forging or a like process is performed on a predetermined alloy, to thereby obtain the sleeve 32.

Subsequently, after the length of the center rod 5 is adjusted by cutting a rear end portion of the center rod 5, the sleeve 32 is disposed on the outer circumferential side of the center rod 5. Then, the front end portion of the sleeve 32 and the rear end portion of the heat generation unit 31 (the tube 33) are joined together by means of laser welding.

The insulating rubber member 9 is inserted between the rear end portion of the sleeve 32 and the center rod 5 after the joining of the sleeve 32 and the heat generation unit 31, and the rear end portion of the sleeve 32 and the distortion member 43 (the inner wall portion 43a) of the sensor structure 4 are joined together. After that, the O-ring 10 is disposed on the outer circumference of the sleeve 32, and the heat generation unit 31 and the sleeve 32 are inserted into the main body portion 21 from its rear end opening. Subsequently, the casing 41 of the sensor structure 4 is joined to the rear end portion of the main body portion 21. Further, the terminal fitting 6 is press-fitted onto and joined to the rear end portion of the center rod 5 projecting rearward from the sensor structure 4.

Next, the above-described heat generation unit 31 is passed through the flexible member 8, which is manufactured in advance. In a state in which the projection 28 of the main body portion 21 is fitted into the rear end portion of the flexible member 8, a laser beam is applied to the outer circumferential surface of the flexible member 8 so as to join the rear end portion of the flexible member 8 and the main body portion 21. Moreover, the heat generation unit 31 (the tube 33) is joined to the front end portion of the flexible member 8.

Finally, in a state in which the heat generation unit 31 is passed through the cap member 22, a laser beam is applied along the outer edge of a contact surface between the front end portion of the main body portion 21 and the rear end portion of the cap member 22. Thus, the cap member 22 and the main body portion 21 are joined together, whereby the above-described combustion pressure sensor 1 is obtained.

As having being described in detail, according to the present embodiment, the Young's modulus of the cap member 22 is made smaller than that of the main body portion 21. Therefore, when a force along the direction of the axis CL1 is applied, the cap member 22 contracts more easily than does the main body portion 21. Accordingly, when the combustion pressure sensor 1 is attached to the internal combustion engine EN, the cap member 22, which does not affect the pressure transmission body 3 even when it deforms compressively, is caused to deform in a greater amount, and the amount of deformation of the main body portion 21, which affects the pressure transmission body 3, can be made relatively small. As a result, the force along the axial direction which acts on the pressure transmission body 3 as a result of deformation of the main body portion 21 can be reduced effectively, and the detection accuracy of combustion pressure can be improved.

Moreover, the rear end portion of the flexible member 8 is fixed to the housing 2 on the front end side of a portion of the housing 2 located at the center between the rear end of the screw portion 24 and the press contact portion 26. Therefore, the length of the flexible member 8, as measured along the axis CL1, can be made relatively short, whereby the pressure transmission body 3 can be held in a more stable state. As a result, the detection accuracy of combustion pressure can be improved further.

Second Embodiment

Next, a second embodiment will be described. In the following description, a structural feature of the second embodiment which differs from those of the first embodiment will be mainly described.

Figure 5:
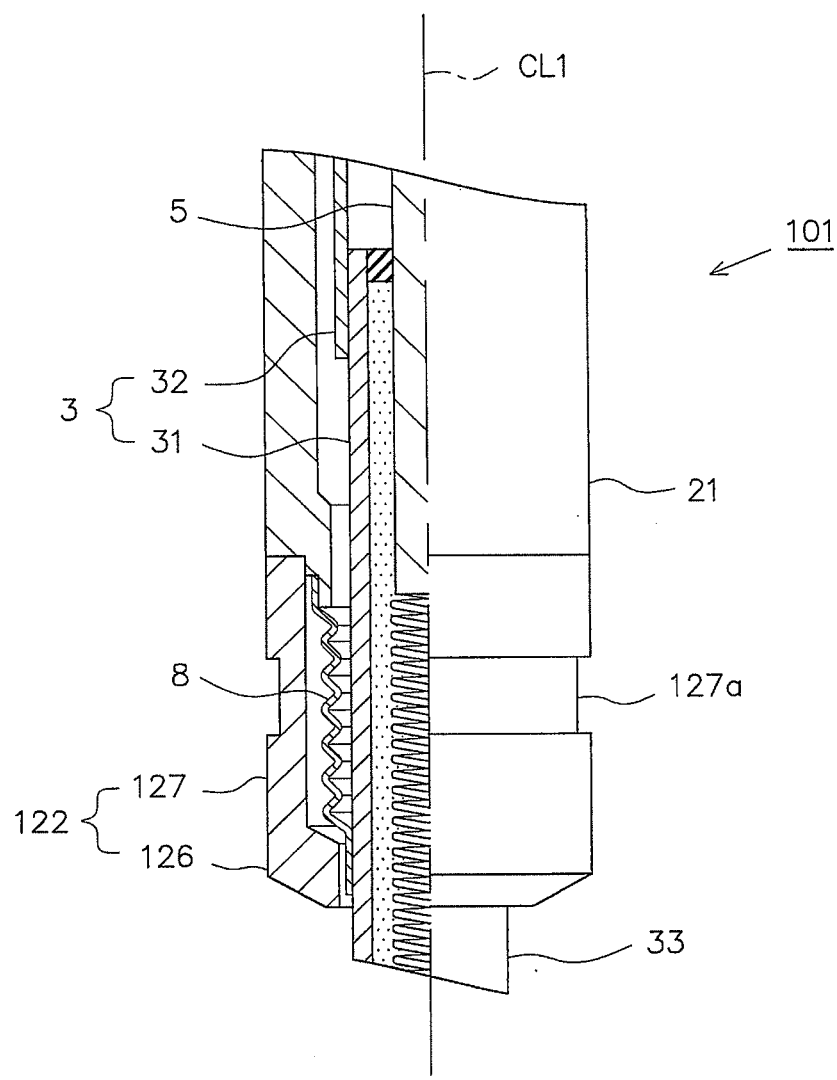
FIG. 5 Enlarged partial cross-sectional view showing the structures of a cap member, etc. in a second embodiment.

As shown in FIG. 5, a combustion pressure sensor 101 according to the second embodiment differs from the first embodiment in the structure of a cap member 122. Specifically, the cap member 122 includes a press contact portion 126 having a relatively large wall thickness, and a cylindrical portion 127 extending along the axis CL1 from the rear end of the press contact portion 126. An annular groove centered at the axis CL1 is formed on the outer circumferential surface of the cylindrical portion 127, whereby a thin wall portion 127a is provided. In order to maintain a required mechanical strength, the cap member 122 is formed of the same metallic material (e.g., carbon steel, SUS or the like) as the main body portion 21.

According to the above-described second embodiment, the cylindrical portion 127 of the cap member 122 has the thin wall portion 127a. Therefore, when the combustion pressure sensor 101 is attached to the internal combustion engine EN, the cap member 122 can be caused to deform in a greater amount, and the amount of deformation of the main body portion 21 can be made relatively small. Thus, the force along the axial direction which acts on the pressure transmission body 3 as a result of deformation of the main body portion 21 can be reduced, and the detection accuracy of combustion pressure can be improved.

Third Embodiment

Figure 7:
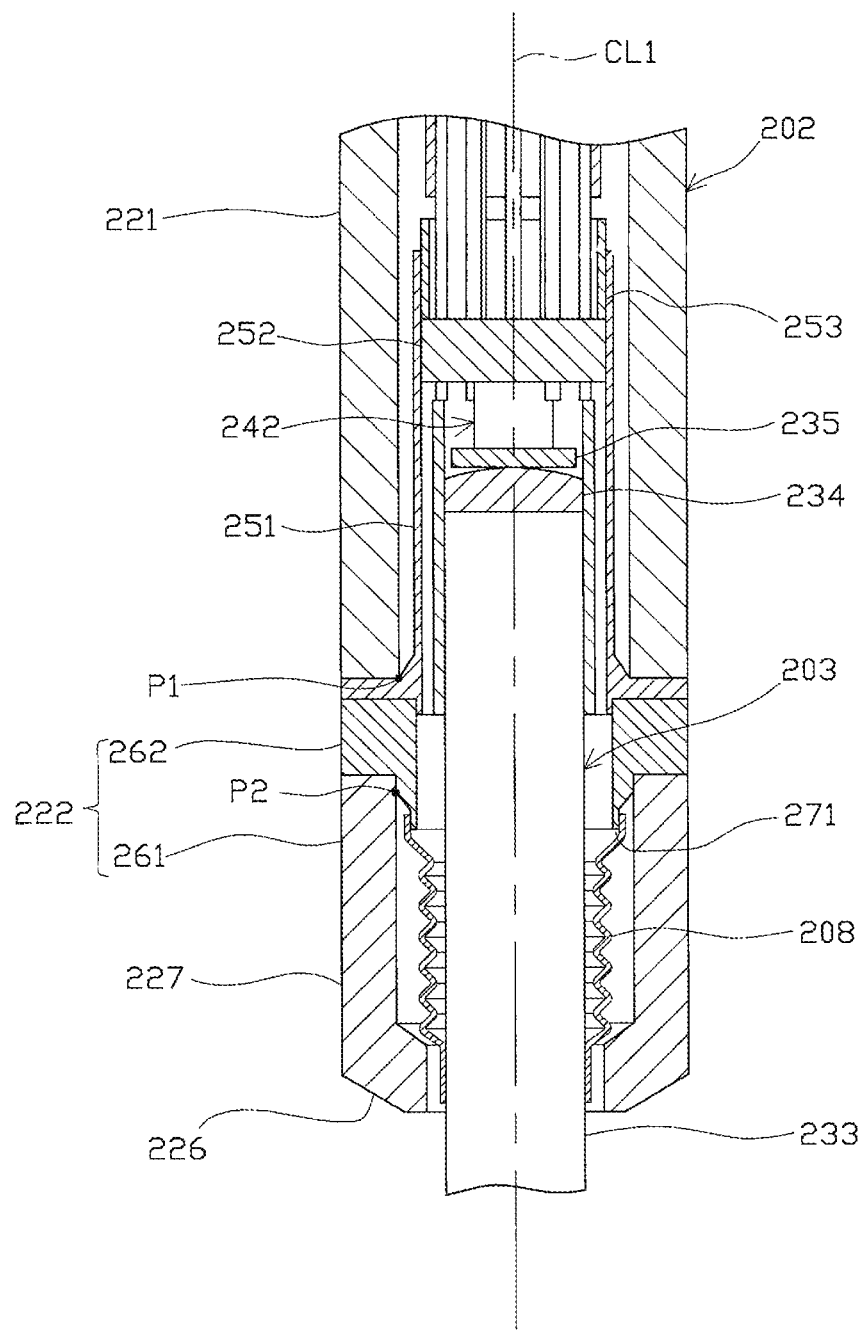
FIG. 7 Enlarged partial cross-sectional view showing the layout of a sensor element, etc. in the third embodiment.

Next, a third embodiment will be described. In the following description, a structural feature of the third embodiment which differs from those of the first and second embodiments will be mainly described. As shown in FIGS. 6A and 6B, in a combustion pressure sensor 201 according to the third embodiment, a sensor element 242 is provided within a housing 202, and is fixed indirectly to a portion of the housing 202 located between the front end of a screw portion 224 and the front end of a press contact portion 226. Specifically, as shown in FIG. 7, the sensor element 242 is fixed to the housing 202 via a tubular sleeve 251 having a portion disposed between and fixed to a main body portion 221 of the housing 202 and a cap member 222, and a pedestal 252 disposed within a rear end portion of the sleeve 251. A stopper member 253 fitted into the sleeve 251 restricts at least rearward movement of the pedestal 252.

The cap member 222 includes a first member 261 having the press contact portion 226, and a second member 262 joined to the rear end of the first member 261. A tubular projection 271 is provided at the front end of the second member 262. The projection 271 has an outer diameter smaller than the inner diameter of the first member 261, and is separated from the first member 261 in the radial direction. A flexible member 208 is fixed to the second member 262 (the housing 202) via the projection 271. That is, one end of the flexible member 208 is fixed to the housing 202 at a position between a portion P1 of the housing 202 to which the sensor element 242 is fixed and the press contact portion 226.

In addition, a portion of the second member 262 located between the main body portion 221 and the first member 261 is greater in wall thickness than at least one of (in the present embodiment, both) a portion of the main body portion 221 between its front end and the screw portion 224, and a cylindrical portion 227 (a cylindrical portion extending rearward from the press contact portion 226) of the first member 261. Notably, the present embodiment may be modified such that, whereas the first member 261 is formed of a material having a relatively low Young's modulus (e.g., a titanium alloy, aluminum, or the like), the second member 262 is formed of a material having a relatively high Young's modulus (e.g., carbon steel, SUS, or the like).

In the third embodiment, as shown in FIG. 6A, a pressure transmission body 203 is constituted by a ceramic heater 233 having a tubular base 231 formed of insulating ceramic, and a heating element 232 formed of electrically conductive ceramic and provided within the base 231; and disk-shaped intermediate members 234 and 235 provided at the rear end of the ceramic heater 233. The outer surface of the pressure transmission body 203 (the ceramic heater 233) is fixed to the other end of the flexible member 208. Notably, in the present embodiment, electric power is supplied to the ceramic heater 233 via a tubular center rod 281 provided inside the housing 202. Further, signals from the sensor element 242 are output to the outside via a plurality of signal lines 282 provided inside the center rod 281.

The combustion pressure sensor 201 according to the third embodiment is configured to satisfy at least one of the following expressions (1) and (2). That is, when a force along the axis CL1 is applied to a portion of the housing 202 between the front end of the screw portion 224 and the press contact portion 226 as shown in FIG. 7, a portion of the housing 202 located between a portion P1 to which the sensor element 242 is fixed and a portion P2 to which the flexible member 208 is fixed is compressed by a compression amount X, a portion of the housing 202 between the portion P2 to which the flexible member 208 is fixed and the front end of the press contact portion 226 is compressed by a compression amount Y, and a portion of the housing 202 between the front end of the screw portion 224 and the portion P1 to which the sensor element 242 is fixed is compressed by a compression amount Z. The combustion pressure sensor 201 is configured to satisfy at least one of the following expressions (1) and (2).

$$X<Y \quad (1)$$

$$X<Z \quad (2)$$

According to the above-described third embodiment, a portion of the housing 202 which affects the pressure transmission body 203 through compressive deformation thereof (a portion of the housing 202 between the portion P1 and the portion P2) can be shortened further. Therefore, the force along the axial direction which acts on the pressure transmission body 203 when the combustion pressure sensor 201 is attached to an internal combustion engine can be reduced effectively.

Moreover, when the combustion pressure sensor 201 is attached to an internal combustion engine, a portion of the housing 202 which does not affect the pressure transmission body 203 even when it deforms compressively (a portion of the housing 202 between the portion P2 and the front end of the press contact portion 226 and a portion of the housing 202 between the front end of the screw portion 224 and the portion P1) contracts to a greater degree as compared with a portion of the housing 202 which affects the pressure transmission body 203 through compressive deformation thereof (a portion between the portions P1 and P2). Therefore, the force along the axial direction which acts on the pressure transmission body 203 when the combustion pressure sensor 201 is attached to an internal combustion engine can be reduced further, and the detection accuracy of combustion pressure can be improved further.

Notably, the present invention is not limited to the details of the above-described embodiments, and may be practiced as follows. Needless to say, other applications and modifications which are not exemplified below are also possible.

(a) In the above-described embodiments, the Young's modulus of the cap member 22 is made smaller than that of the main body portion 21, or the thin wall portion 127a is provided on the outer circumferential surface of the cylindrical portion 127. Thus, when a force along the axis CL1 is applied to the housing 2, the compression amount per unit length along the axis CL1 of the main body portion 21 becomes smaller than that of the cap member 22. Further, when a force along the axis CL1 is applied to the housing 2, the compression amount of a portion of the housing 2 between the portion to which the flexible member 8 is fixed and the front end of the screw portion 24 becomes smaller than the compression amount of a portion of the housing 2 between the portion to which the flexible member 8 is fixed and the front end of the press contact portion 26. However, the method of realizing such a configuration is not limited to the methods of the above-described embodiments. For example, the above-described configuration can be realized by means of providing an annular curved portion (centered at the axis CL1) on the cylindrical portion 27 of the cap member 22, while maintaining the constant wall thickness of the cylindrical portion 27.

Figure 8:
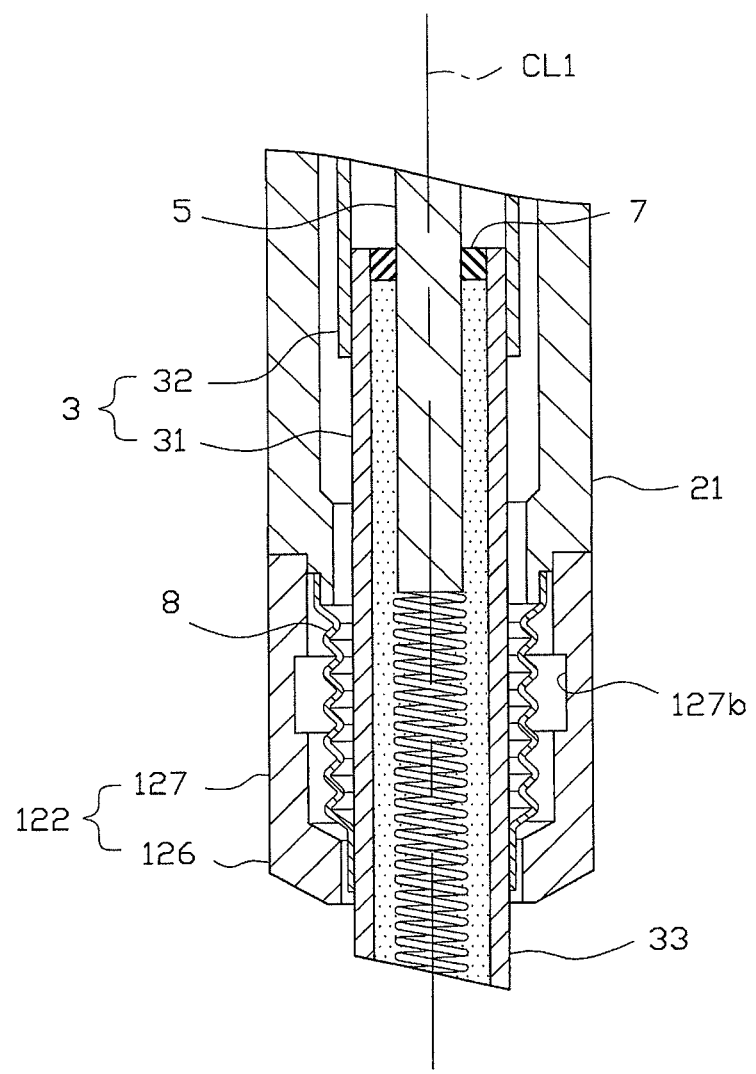
FIG. 8 Enlarged partial cross-sectional view showing the structures of a cap member, etc. in another embodiment.

(b) In the above-described second embodiment, the thin wall portion 127a is provided on the outer circumferential surface of the cylindrical portion 127. However, as shown in FIG. 8, a thin wall portion 127b may be provided on the inner circumferential surface of the cylindrical portion 127. In this case as well, actions and effects similar to those of the second embodiment can be attained.

(c) In the above-described embodiments, the pressure transmission body 3 includes the heat generation unit 31. However, the combustion pressure sensor may be configured without use of the heat generation unit 31 (that is, by eliminating the heating function).

(d) In the above-described embodiments, a semiconductor stain gauge which includes piezoresistance elements formed on a semiconductor substrate is used as the sensor element 42. However, the sensor element 42 is not limited thereto, and a piezoelectric element or the like may be used.

(e) In the above-described embodiments, the pressure transmission body 3 is held by the flexible member 8 having the bellows portion 81. However, the structure of the flexible member 8 is not limited thereto. For example, a member which has a tubular portion and a flange portion extending from an end portion of the tubular portion in the radially outward direction and in which the flange portion can deform in relation to the tubular portion, or a tubular member (so-called membrane) which can displace along the direction of the axis through curving in the radial direction may be used as the flexible member. Notably, when a membrane is used, the pressure transmission body 3 is fixed to the tubular portion (the front end of the tubular member), and the flange portion (the rear end of the tubular member) is fixed to the main body portion 21.

Figure 9:
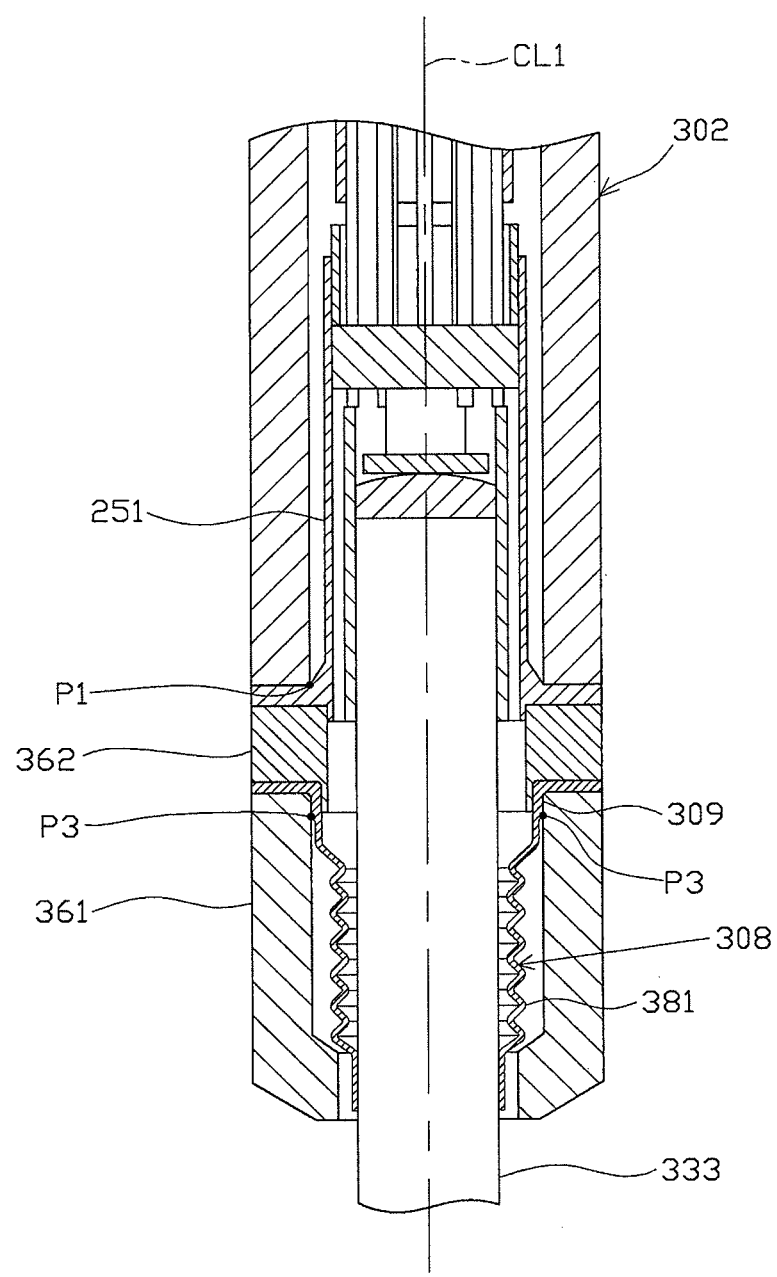
FIG. 9 Enlarged partial cross-sectional view showing the manner of fixing of a flexible member to a housing in another embodiment.

(f) In the above-described third embodiment, the flexible member 208 is fixed indirectly to the second member 262 of the housing 202. However, the third embodiment may be modified as shown in FIG. 9. Specifically, a rear end portion of a flexible member 308 is formed into a flange, and the flange is sandwiched between and is joined to first and second members 361 and 362, whereby the flexible member 308 is fixed to a housing 302. Notably, in this case, the "portion of the housing to which the flexible member is fixed" refers to the frontmost portion P3 of an area in which the housing 302 and the flexible member 308 are fixed together. That is, the portion P3 is a portion of the flexible member 308 for relatively moving the ceramic heater 333 rearward, and is located between a tubular portion 309 which does not move even when a combustion pressure acts thereon, and a bellows portion 381 which is separated from the first member 361 in the radial direction and deforms when a combustion pressure acts thereon. Further, the structure shown in FIG. 9 may be modified such that the second member 362 is removed, and the flange portion of the flexible member 308 is joined directly to the front end portion of the sleeve 251 formed into a flange shape.

(g) The shape, etc. of the combustion pressure sensor 1 are not limited to those of the above-described embodiments. For example, the tube 33 may be modified such that the heat generation portion 33b having a small diameter is omitted, and the tube 33 has a straight shape; i.e., has an approximately constant outer diameter up to the front end of the tube 33. No particular limitation is imposed on the position of the sensor element. For example, the sensor element may be provided within the main body portion 21.

(h) In the above-described embodiments, the combustion pressure sensor 1 has the control coil 35. However, the control coil 35 may be omitted. In such a case, the rear end of the heat generation coil 34 is joined directly to the center rod 5.

DESCRIPTION OF REFERENCE NUMERALS
AND SYMBOLS

1, 101: combustion pressure sensor
2: housing
3: pressure transmission body
8: flexible member
21: main body portion
22, 122: cap member
24: screw portion
26, 126: press contact portion
27, 127: cylindrical portion
42: sensor element
127a, 127b: thin wall portion
CL1: axis
EN: internal combustion engine
HO: mounting hole

The invention claimed is:

1. A combustion pressure sensor comprising:
a tubular housing having an axial hole extending in a direction of an axis;
a flexible member disposed within the axial hole and fixed at one end to the housing, the flexible member being displaceable and contractable along the direction of the axis;
a rod-shaped pressure transmission body inserted into the axial hole and fixed, through its outer circumferential surface, to the other end of the flexible member, the pressure transmission body having a front end portion exposed to the outside; and
a sensor element fixed directly or indirectly to the housing and outputting a signal on the basis of a pressure applied thereto from the pressure transmission body, wherein
the housing has a screw portion for screw engagement with a mounting hole of an internal combustion engine, and a press contact portion which is press-contacted with the internal combustion engine when the screw portion is screwed into the mounting hole of the internal combustion engine,
the combustion pressure sensor being characterized in that
the sensor element is fixed directly or indirectly to a portion of the housing located between a front end of the screw portion and a front end of the press contact portion;
the flexible member is fixed to a portion of the housing located between the portion of the housing to which the sensor element is fixed and the press contact portion; and
a relation X<Y is satisfied where X represents an amount of compression of a portion of the housing between the portion of the housing to which the sensor element is fixed and the portion of the housing to which the flexible member is fixed, and Y represents an amount of compression of a portion of the housing between the portion of the housing to which the flexible member is fixed and a front end of the press contact portion, the compression amounts being measured when a force along the axis is applied to a portion of the housing located between the front end of the screw portion and the press contact portion.

2. A combustion pressure sensor according to claim 1, wherein at least a portion of the exposed front end portion of the pressure transmission body is a heat generation unit.

3. A combustion pressure sensor comprising:
a tubular housing having an axial hole extending in a direction of an axis;
a flexible member disposed within the axial hole and fixed at one end to the housing, the flexible member being displaceable and contractable along the direction of the axis;
a rod-shaped pressure transmission body inserted into the axial hole and fixed, through its outer circumferential surface, to the other end of the flexible member, the pressure transmission body having a front end portion exposed to the outside; and
a sensor element fixed directly or indirectly to the housing and outputting a signal on the basis of a pressure applied thereto from the pressure transmission body, wherein
the housing has a screw portion for screw engagement with a mounting hole of an internal combustion engine, and a press contact portion which is press-contacted with the internal combustion engine when the screw portion is screwed into the mounting hole of the internal combustion engine,
the combustion pressure sensor being characterized in that
the sensor element is fixed directly or indirectly to a portion of the housing located between a front end of the screw portion and a front end of the press contact portion;
the flexible member is fixed to a portion of the housing located between the portion of the housing to which the sensor element is fixed and the press contact portion; and
a relation X<Z is satisfied where X represents an amount of compression of a portion of the housing between the portion of the housing to which the sensor element is fixed and the portion of the housing to which the flexible member is fixed, and Z represents an amount of compression of a portion of the housing between a front end of the screw portion and the portion of the housing to which the sensor element is fixed, the compression amounts being measured when a force along the axis is applied to a portion of the housing located between the front end of the screw portion and the press contact portion.

4. A combustion pressure sensor according to claim 3, wherein at least a portion of the exposed front end portion of the pressure transmission body is a heat generation unit.

* * * * *